(12) United States Patent
Williams et al.

(10) Patent No.: US 6,590,500 B1
(45) Date of Patent: Jul. 8, 2003

(54) METHOD OF LINEARIZING A SINE AND COSINE SIGNAL

(75) Inventors: Kimball Williams, Dearborn, MI (US); Peter M. Jacobsen, Oakland Township, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 10/102,388

(22) Filed: Mar. 19, 2002

(51) Int. Cl.[7] .............................................. G08B 21/00
(52) U.S. Cl. .............................. 340/686.1; 340/686.3; 318/439; 324/207.24
(58) Field of Search ........................ 340/686.1, 686.3; 318/439; 324/207.24, 207.11

(56) References Cited

U.S. PATENT DOCUMENTS

| | | | |
|---|---|---|---|
| 4,070,665 A | 1/1978 | Glennon et al. | 340/347 |
| 4,093,903 A | 6/1978 | Thomas | 318/584 |
| 4,984,857 A | 1/1991 | Yeung et al. | 350/6.6 |
| 5,235,177 A | 8/1993 | Hutchinson et al. | 250/225 |
| 5,373,389 A | 12/1994 | Huber | 359/195 |
| 6,087,654 A * | 7/2000 | Durham, III | 250/231.13 |
| 6,118,271 A * | 9/2000 | Ely et al. | 324/207.17 |

* cited by examiner

Primary Examiner—Julie Lieu
(74) Attorney, Agent, or Firm—Roger A. Johnston

(57) ABSTRACT

A rotary position transducer with a cosine and sine attenuating voltage wave output has the substantially linear portions segmented and pieced together from a predetermined set of conditions to form a continuously linearly varying voltage output.

4 Claims, 4 Drawing Sheets

METHOD OF LINEARIZING A SINE AND COSINE SIGNAL

BACKGROUND OF THE INVENTION

The present invention relates to providing a continuously variable electrical signal from a transducer indicating the relative position of an object with respect to a stationary reference. In particular, the invention relates to providing an electrical signal indicative of the angular position of a magnet disposed on the object with respect to the stationary reference. Devices of this type are particularly desirable for indicating the relative position of the magnet and the object and find application in linear and rotary position sensing devices.

It is known to provide a magneto resistive sensor for indicating the position of a magnet moving with an object; and, such a sensor is that produced by the Honeywell Corporation and bearing manufacturer designation HMC1512.

Referring to FIG. 4, the electrical output of a known sensor is shown wherein the voltage wave is plotted as a function of the rotary position $(\ominus)$ in degrees and indicates the phase difference of 45° for the functions SIN $2(\ominus)$ and COS $2(\ominus)$ with a period of 180° (Π radians) for the voltage wave output of the transducer.

However, it has been desired to provide a rotary position transducer having a linear voltage output with respect to the rotary position of the magnet with respect to the stationary sensor. A linear output has the advantage that the output voltage may be used to drive directly an indicator such as a volt meter to give an easy-to-read indication to the user of the rotary position of the object.

BRIEF SUMMARY OF THE INVENTION

The present invention provides a method for linearizing the output of a motion detecting transducer having a dual wave form output in the form of a sine and cosine wave voltage. The linearization is accomplished by piecing together and inverting where necessary the substantially linear portion of the sine and cosine waves of the transducer output voltage. An amplifier and comparator function are utilized to provide an analog output of substantially linearly varying voltage as the transducer detects motion of an object moving with respect to the stationary transducer. The moving object has a magnet associated therewith; and, the change in angular bearing of the object is measured by a transducer and the transducer voltage wave form segmented and pieced together in accordance with a predetermined set of conditions for each segment as the angle of bearing changes from zero to 90°.

DETAILED DESCRIPTION OF THE INVENTION

Figure 1:
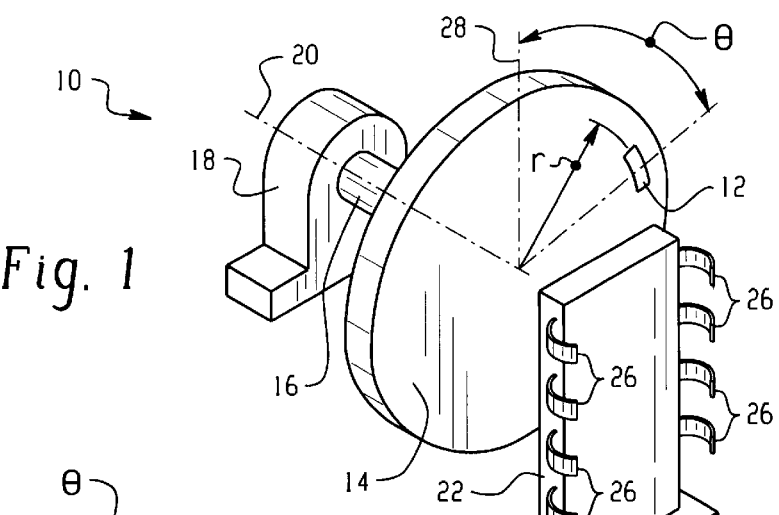
FIG. 1 is an embodiment of the present invention with a magnet mounted for rotation at a radius R about an axis fixed with respect to a sensor.

Referring to FIG. 1, a sensor arrangement employing the present invention is indicated generally at 10 and includes a magnet 12 disposed on an object 14 rotated by shaft 16 disposed in a bearing block 18 for rotation about fixed axis 20. The magnet is positioned to revolve about the axis 20 at a distance "r". A transducer or sensor 22 is mounted adjacent the object 14 on a suitable base 24 and is adapted for connection to input to appropriate signal processing circuitry, which will hereinafter be described, by means of the electrical terminals 26 provided on the sensor 22. Sensor 22 measures the angle $(\ominus)$ with respect to the fixed reference 28.

In the present practice of the invention, a rotary position sensor manufactured by the Honeywell Corporation bearing manufacturer designation HMC1512 has been found satisfactory for the sensor 22. However, any suitable transducer having a dual sine and cosine wave form voltage output may be employed.

Figure 2:
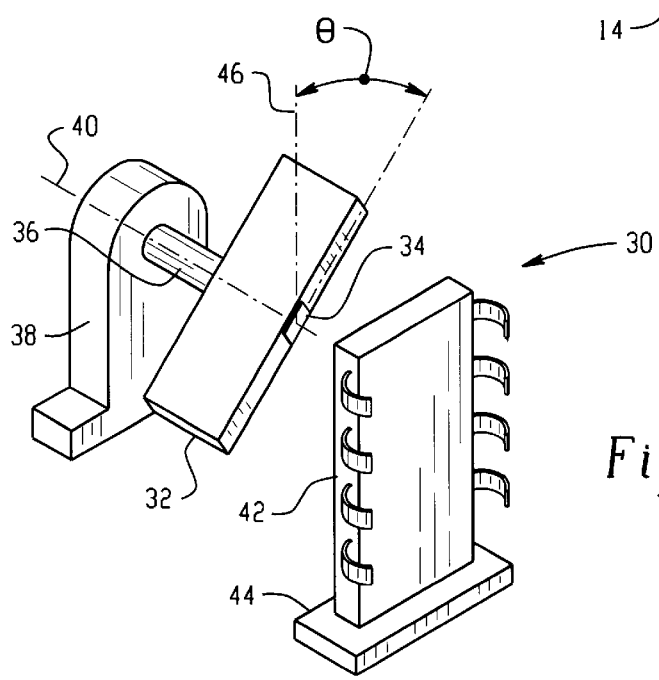
FIG. 2 is an alternate embodiment of the invention with the magnet rotating about an axis fixed with respect to the sensor and passing through the center of the magnet.

Referring to FIG. 2, an alternate embodiment of a system employing the invention is illustrated generally at 30 and has an object 32 with a magnet 34 disposed thereon for rotation on shaft 36 journalled in fixed support 38 for rotation about fixed axis 40. A sensor 42 which may be similar to the sensor 22 of the FIG. 1 embodiment is mounted adjacent the rotating magnet 34 on a suitable base 44. The magnet is denoted as subtending a central angle $(\ominus)$ with a fixed reference 46 for purposes of correlation with the wave form signal output of sensor 42.

Figure 3:
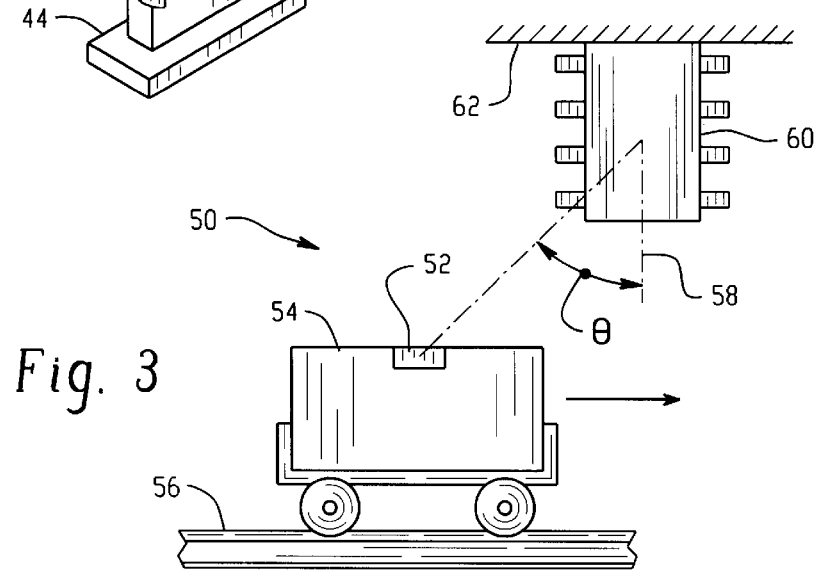
FIG. 3 is another embodiment of the invention having a magnet mounted on a trolley moving along a linear path displaced from the sensor.
Figure 4:
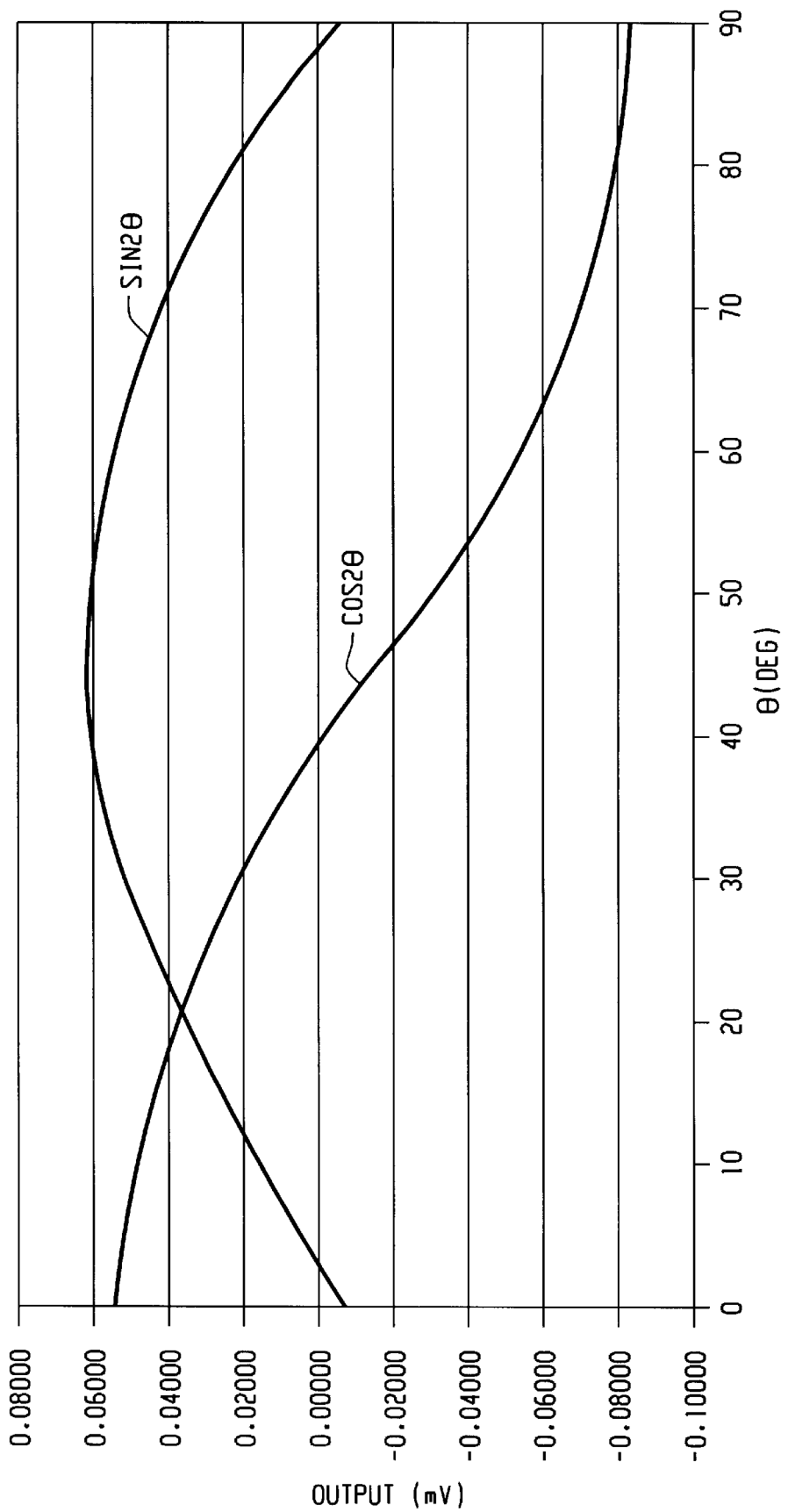
FIG. 4 is a plot of voltage versus angle of rotation for a dual wave form output transducer.

Referring to FIG. 3, another embodiment of the invention is indicated generally at 50 and includes a magnet 52 disposed on a moving object 54 in the form of a trolley moving in the direction indicated by the black arrow along a surface or track 56 and subtending a central angle $(\ominus)$ with respect to a fixed reference 58. A rotary position sensor 60 is disposed on base 62; and, in the present practice of the invention the sensor 60 is similar to the sensor 22 of FIG. 1 or the sensor 42 of FIG. 2.

Figure 5:
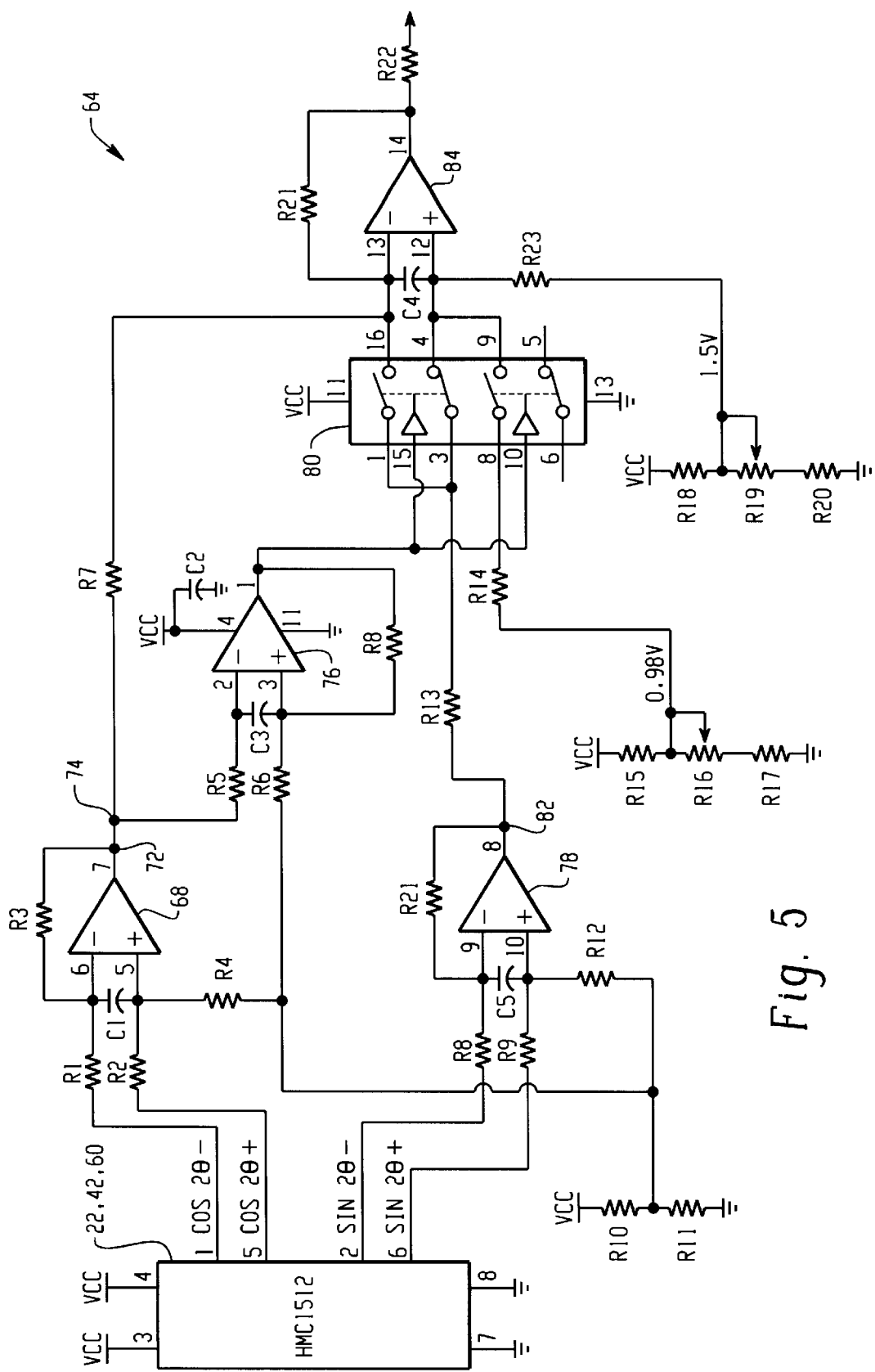
FIG. 5 is a schematic of the processing circuitry for the present invention.
Figure 6:
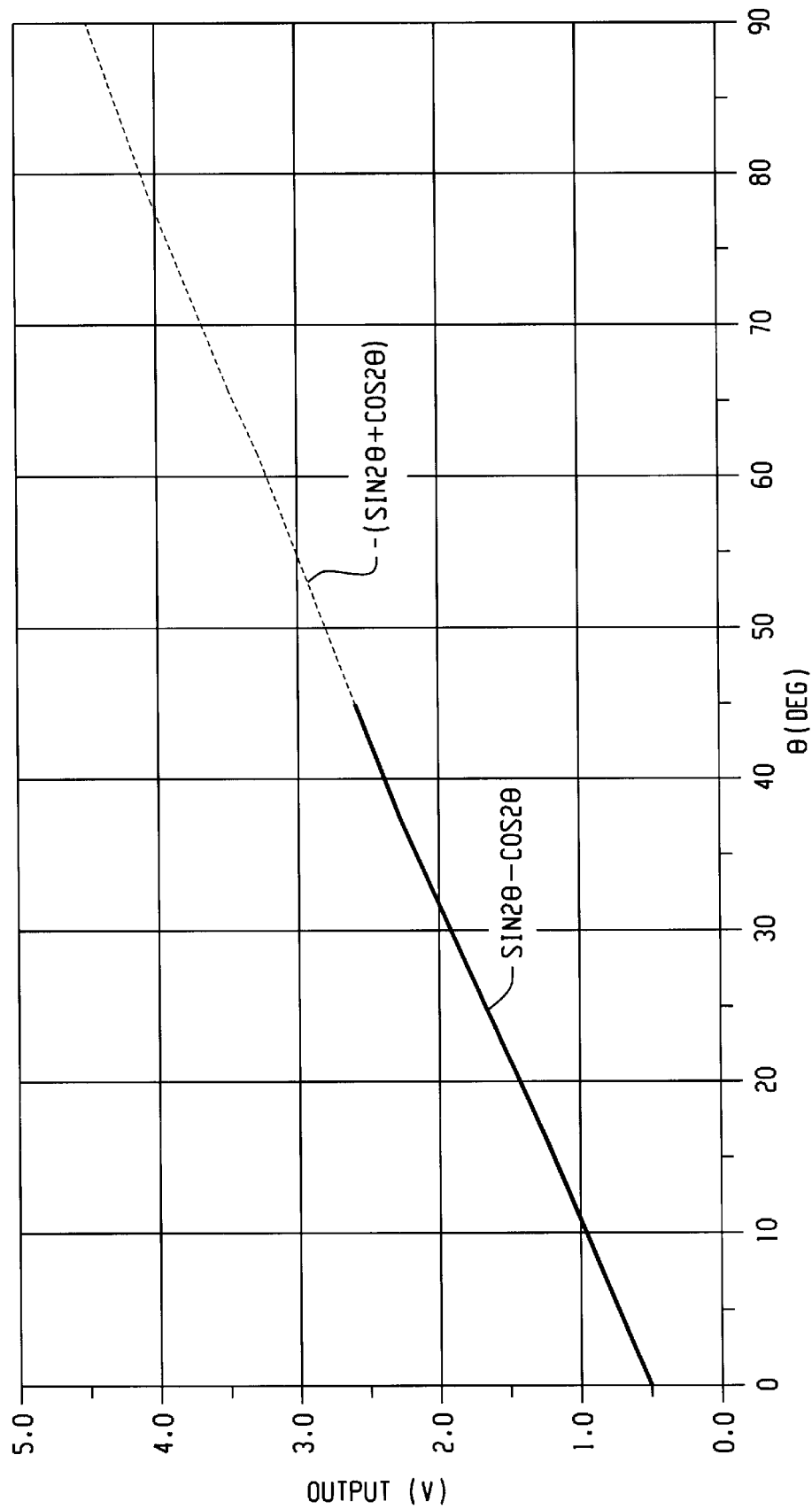
FIG. 6 is a plot of voltage versus angle of rotation for the output voltage of the present invention.

Referring to FIG. 5, the circuit schematic of the present invention is indicated generally at 64. A positive COS $2(\ominus)$ voltage wave form from any of the sensors 22, 42, 60, which are excited by a constant D. C. voltage Vcc is applied through a resistor R1 to the negative input of a differential amplifier 68, with preferably a gain of 2, with the positive terminal of the amplifier also receiving a negative voltage for COS $2(\ominus)$ through a resistor R2. The output of amplifier 68 at terminal 72 is fed back to the negative input through resistor R3 thus giving the amplifier output a value of 2A COS $2(\ominus)+K_2$ which is applied to junction 74 and through R5 to the negative input of a comparator 76 which outputs a signal to a switch 80 when COS $2(\ominus)$ is greater than $K_2$. The output of comparator 76 is fed back through R8 to the positive input.

The positive voltage wave form comprising SIN $2(\ominus)$ is applied through R9 to the positive input of a differential amplifier 78, which is connected through a resistance R13 to the feed or common input of switch 80; and, the positive input of amplifier 78 also receives a reference voltage $K_3$ through resistor R9. The negative input of amplifier 78 receives the negative voltage SIN $2(\ominus)$ through resistor R8. The output of amplifier 78 is 2B SIN $2(\ominus)+1$ and is connected to junction 82 and is fed back through resistance R21 to the negative input of the amplifier 78. Junction 82 is also connected through R13 to one side the of switch 80 and provides a positive SIN 2$\Theta$ input thereto.

The wave form voltage COS 2$\Theta$ from junction 74 is also applied through R7 to the negative input terminal of a differential amplifier 84 which has its positive input receiving a positive or negative SIN 2$\Theta$ signal from switch 80.

The switch 80 is thus operative to provide switched positive and negative values of SIN 2$\Theta$ the amplifier 84 at the positive input of amplifier 84, which is biased with about 1.5 volts applied through a resistor R23. The output of amplifier 84 is set forth in Table I below.

TABLE I

| $\Theta$ | V |
|---|---|
| 0 | SIN2$\Theta$-COS2$\Theta$ + $K_1$ |
| 45°- | |
| 90° | -SIN2$\Theta$-COS2$\Theta$ + $K_2$ |

The values and description of the individual circuit components are set in Table II.

TABLE II

| Resistors | | Capacitors | | Other Devices | |
|---|---|---|---|---|---|
| R | Ohms | C | Farads | Ref. No. | Type |
| 1,2,8,9 | 1 Meg, 1% | 1,3,4,5 | 56 pf | 22,42,60 | HMC 1512 |
| 3,4,12,21 | 2 Meg, 1% | 2 | .1 µf, 200 V | 68,76,78,84 | 1/4 LMC 6484 |
| 7,13,14 | 130K, 1% | | | 80 | PISA 383AP |
| 5,6 | 10K | | | | |
| 10 | 4.02K, 1% | | | | |
| 11 | 1K, 1% | | | | |
| 8 | 5.1M | | | | |
| 15,18 | 3.6K | | | | |
| 16,19 | 1.0K Var. | | | | |
| 17 | 500 | | | | |
| 20 | 1K | | | | |
| 22 | 100, 1/4 W | | | | |
| 23 | 1 Meg. | | | | |

It will be understood that A and B shall be chosen to provide the desired output voltage span over the range of the operating angle $\Theta$. In the present practice of the invention, A and B have been chosen such that the linear output spans from 0 to 5 volts over the angle range 0 to 90°. It will be apparent that other values may be used.

It will be further understood that the constants $K_1$ to $K_2$ shall be chosen such that when the substantially linear segments are pieced together, there is a smooth and continuous linear output voltage without steps at each connecting segment.

The present invention thus provides a simple and relatively low cost method of converting the sine and cosine voltage wave forms of a rotary position sensor to an analog signal varying linearly with respect to the position angle of an object moving with respect to the sensor.

Although the invention has hereinabove been described with respect to the illustrated embodiments, it will be understood that the invention is capable of modification and variation and is limited only by the following claims.

What is claimed is:

1. A method of providing substantially linear electrical signal in response to an object moving relative to a stationary reference comprising (a) disposing a magnet for movement with the object;

(b) disposing a stationary sensor to be proximate the moving object and electrically exciting the sensor with substantially constant direct current voltage;

(c) generating a sine wave voltage signal and a cosine wave signal with the sensor as the object is moved with respect to the stationary reference; and (d) connecting a signal processing circuit to receive said sine wave and cosine wave signal and generating an output voltage signal voltage (N) in accordance with the following able of values of $\Theta$ where $K_1$ and $K_2$ are respectively predetermined constants:

| $\Theta$ | V |
|---|---|
| 0–$\pi$/4 | SIN2$\Theta$– COS2$\Theta$ = $K_1$ |
| $\pi$/4–$\pi$/2 | –SIN2$\Theta$ –COS2$\Theta$ = $K_2$. |

2. The method defined in claim 1, wherein the step of generating an output voltage includes biasing the voltage a predetermined amount.

3. The method defined in claim 1 wherein said step of disposing a magnet for movement includes disposing a magnet for curvilinear movement with respect to the sensor.

4. The method defined in claim 1 wherein said step of disposing a magnet for movement includes rotating the magnet with respect to the sensor about an axis passing through the magnet.

* * * * *